(12) United States Patent
Sanada et al.

(10) Patent No.: US 7,914,922 B2
(45) Date of Patent: Mar. 29, 2011

(54) BATTERY PACK OF ASSEMBLED BATTERY AND FIXING METHOD OF ASSEMBLED BATTERY

(75) Inventors: Yasushi Sanada, Yokohama (JP);
Yoshinao Tatebayashi, Yokohama (JP);
Nobuo Shibuya, Hiratsuka (JP);
Shinichiro Kosugi, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 811 days.

(21) Appl. No.: 11/444,488

(22) Filed: Jun. 1, 2006

(65) Prior Publication Data
US 2006/0275658 A1 Dec. 7, 2006

(30) Foreign Application Priority Data
Jun. 2, 2005 (JP) .................................. 2005-162429

(51) Int. Cl.
*H01M 2/08* (2006.01)
*H01M 6/46* (2006.01)

(52) U.S. Cl. ....................................... 429/152; 429/159
(58) Field of Classification Search ............ 429/96–100, 429/149–161
See application file for complete search history.

(56) References Cited

U.S. PATENT DOCUMENTS

| 5,535,941 A * | 7/1996 | Garza ............................. 229/191 |
| 2004/0016455 A1 * | 1/2004 | Oogami ......................... 136/244 |
| 2004/0062986 A1 * | 4/2004 | Aamodt et al. ................ 429/181 |
| 2005/0202315 A1 * | 9/2005 | Sugeno et al. ................. 429/156 |
| 2005/0208375 A1 * | 9/2005 | Sakurai .......................... 429/162 |

FOREIGN PATENT DOCUMENTS

JP 2004055346 A * 2/2004

OTHER PUBLICATIONS

U.S. Appl. No. 11/383,603, filed May 16, 2006, Shibuya et al.
U.S. Appl. No. 11/444,492, filed Jun. 1, 2006, Sanada et al.

* cited by examiner

*Primary Examiner* — Ula C Ruddock
*Assistant Examiner* — Stephen Yanchuk
(74) *Attorney, Agent, or Firm* — Oblon, Spivak, McClelland, Maier & Neustadt, L.L.P.

(57) ABSTRACT

A battery pack of a battery includes a plurality of laminated cells that are hermetically sealed by a laminated film, a case for storing the plurality of the laminated cells, a positive electrode terminal and a negative electrode terminal of a battery for connecting the cells in parallel or series for connection to the outside of the case, a lid member for pressing the cells from the uppermost surface of the laminate of the cells stored in the case toward the inner side of the case in the direction opposite to the laminating direction of the cells, and a fixing member for fixing the lid member to the case at a position where a predetermined pressing force is applied.

12 Claims, 7 Drawing Sheets

US 7,914,922 B2

BATTERY PACK OF ASSEMBLED BATTERY AND FIXING METHOD OF ASSEMBLED BATTERY

BACKGROUND OF THE INVENTION

1. Field of the Invention

The present invention relates to a battery pack of an assembled battery composed of a plurality of laminated cells sheathed with a laminate film. In particular, the present invention relates to a battery pack of an assembled battery of a structure mechanically secured against an external force such as vibration or impact exerted on the battery, and also relates to a fixing method for the battery.

2. Related Art

A conventional battery pack is composed of one cell. Such a battery pack is of a small capacity and its use is often limited to applications involving relatively little vibration or impact. In recent years, a lightweight and compact, yet high-capacity, battery composed of a plurality of cells, such as a lithium battery, has been developed for use in portable devices, electric automobiles, and the like. Herein, the assembled battery may be called merely "battery".

Each individual cell (herein, a battery cell provided with a pair of positive and negative electrode terminals and constituting the minimum output unit of an assembled battery is referred to as the cell) of a lithium battery or the like used for such applications is constructed as follows.

That is, the electrode terminal portion of a flat-shaped cell is sandwiched between laminate films for maintaining sealing property through the intermediation of a sealant such as polyethylene, followed by heat sealing along the outer peripheral edge portion to thereby prevent leakage of electrolyte.

Since an assembled battery used in portable devices or electric automobiles is required to have a large capacity, the battery uses a large number of laminated cells, so that the mass of the battery pack becomes large.

Further, since such a battery is used under environments involving a larger vibration amplitude and a broader vibration frequency band than those of conventional batteries, it is expected that fatigue breaking in the electrode terminal portion of each cell, the welding connection portion between the electrode terminals of cells, and the welding connection portion between the electrode terminals of cells and the battery terminals of the obtained battery, or breakage of the heat-seal portion of each cell can readily occur.

In this view point, with respect to a battery pack of an assembled battery having a structure in which a plurality of such flat-shaped cells are laminated so as to obtain a predetermined output, there has been proposed a technique according to which the laminate of the individual cells of the battery is fixed in place by fixing means composed of a pressing member pressing the surface of sealing means, and an elastic member such as a spring which supports and fixes the pressing member in place, thereby preventing, with respect to vibration applied from the outside of the battery pack, fatigue breaking of the welding connection portion of the electrode terminals and leakage of an electrolyte solution due to peeling of the heat-seal portion of each cell as disclosed, for example, Japanese Patent Application Laid-open Publication No. 2004-55346.

The fixing means disclosed in this Japanese publication employs a vibration suppression method by which the centroid position of the contact surface between the cells and the pressing member is supported and pressed by an elastic member such as a spring. The fixing means is thus a fixing method for suppressing natural vibration of the cells.

Accordingly, since the laminated cells are supported by an elastic member, displacement due to the vibration constantly occurs, so that such problems as positional displacement of respective cells, fatigue breaking of the welding connection portion of the electrode terminals, and breakage of the heat-seal portion of the cells will still occur.

Further, the above-described method of supporting the centroid position by an elastic member involves problems in that the structure becomes complicated due to the increased number of parts for the fixing means, and that the size of the battery pack of the battery is enlarged because of the increased dead space due to the necessity of securing a space for allowing displacement of the spring as the elastic member.

SUMMARY OF THE INVENTION

The present invention has been made in consideration of the circumstances encountered in the prior art mentioned above, and accordingly, an object of the present invention is to provide a battery pack of an assembled battery and a fixing method therefor, which allow an improvement in positional displacement preventing effect and vibration suppressing effect with respect to cells stored within the battery pack while avoiding an increase in the number of parts as much as possible and by means of simple construction and procedure.

This and other objects can be achieved according to the present invention by providing, in one aspect, a battery pack of an assembled battery, comprising:

an assembled battery including a plurality of flat-shaped cells that are hermetically sealed by a laminate film;

a case for accommodating the cells so as to be laminated in a thickness direction thereof, the case having an opening formed at least at one end thereof;

a lid member for pressing the laminated cells from one end of the opening of the case in a laminating direction; and a fixing member for fixing the lid member to the case at a position to which a predetermined pressing force is applied.

In a preferred embodiment in this aspect, the battery pack may further comprise an adhesive or a double-sided adhesive tape applied to each of contact surfaces between the lid member and a surface of the uppermost one of the laminated cells, between a bottom surface of the case and a bottom surface of the lowermost one of the laminated cells, and between surfaces of the cells.

The fixing member may include a deformation part formed in one of the case and the lid member, said deformation part being deformed so as to fix the lid member and the case at the position to which the predetermined pressing force is applied.

It is desirable that the pressing force of the lid member is set within a range that does not cause a tension generated in the laminate film to exceed a strength of the laminate film and an adhesion strength of the laminate film and allows a frictional force to be obtained, said friction force acting to prevent each of the cells from being displaced within the case upon application of a vibration from outside of the assembled battery.

In another aspect of the present invention, there is provided a method of fixing an assembled battery for a battery pack having a plurality of cells to be hermetically sealed by a laminated film in a manner laminated in a thickness direction thereof, a case for accommodating the cells and a lid member for pressing the laminated cells, comprising the steps of:

sandwiching the plurality of cells by the case and the lid member;

pressing the lid member with a preset pressing force, the pressing force being set within a range that does not cause a tension generated in the laminate film to exceed a strength of the laminate film and an adhesion strength of the laminate film and allows a frictional force to be obtained, the friction force acting to prevent each of the cells from being displaced within the case upon application of a vibration from outside of the battery; and fixing the lid member and the case in position within the setting range of the pressing force.

In a further aspect, there is also provided a battery pack of an assembled battery comprising:

an assembled battery including a plurality of flat-shaped cells that are hermetically sealed by a laminate film;

a plurality of trays on each of which each of the cells is placed;

a case for accommodating the cells in a state in which the cells are laminated in a thickness direction thereof while being placed on the trays, the case having an opening formed at least at one end thereof, the plurality of trays being fitted inside the case;

a lid member for pressing the cells, which are laminated while being placed on the trays, from one end of the opening of the case in a laminating direction; and a fixing member for fixing the lid member to the case at a position to which a predetermined pressing force is applied.

In this aspect, each of the trays may include a contact part for guiding at least a placing position for each of the cells, said contact part contacting opposite inner wall surfaces of the case.

The contact part of each of the trays may be formed by a plurality of thin leaf springs that come into line-contact or surface-contact with an inner wall surface of the case, the contact part being brought into press contact with the inner wall surface of the case. The contact part of each of the trays may include a plurality of thin leaf springs that are bent in different directions with respect to a direction orthogonal to the laminating direction of the cells. The contact part of each of the trays may include a fitting engagement part at which the trays come into fitting engagement with each other.

The trays may be formed by curving flat-shaped plates on which the cells are laminated.

The case may include at a bottom corner portion at which a part that comes into fitting engagement with the lowermost one of the trays contacting a bottom surface of the case is provided.

As described above, according to the present invention, in order that the battery composed of the plurality of laminated cells can be regarded as a rigid member, a construction is adopted in which the battery is sandwiched between the case and the lid member, and either end surface thereof is pressed with a predetermined force, that is, within the range of a pressing force which does not cause a tension generated in the laminate film to exceed a strength of the laminate film and an adhesion strength of the laminate film and makes it possible to obtain a frictional force for preventing each of the cells from being displaced within the case upon application of a vibration from the outside, the position between the lid member and the case being fixed at the position where the predetermined pressing force is obtained. Accordingly, it is possible to provide a battery pack of an assembled battery and a fixing method for the battery, which allow an improvement in the effect of suppressing vibration of cells stored within the battery pack while keeping an increase in the number of parts to a minimum and by means of simple construction and procedure.

Further, the cells are laminated using the trays on which the respective cells are placed, and each of the trays is provided with the contact part that contacts opposite inner wall surfaces of the case, the contact part being formed of a thin leaf spring and brought into press contact with the inner wall surfaces of the case. Accordingly, it is possible to provide a battery pack of a battery which is not readily displaced in position due to vibration.

It is further to be noted that the nature and further characteristic features of the present invention will be made more clear from the following descriptions made with reference to the accompanying drawings.

BRIEF DESCRIPTION OF THE DRAWINGS

In the accompanying drawings:

FIGS. 8A to 8C are views illustrating a state in which each cell is placed on the tray according to the second embodiment of the present invention, in which FIGS. 8A and 8B are perspective views and FIG. 8C is a sectional view.

DESCRIPTION OF THE PREFERRED EMBODIMENTS

Preferred embodiments of the present invention will be described hereunder with reference to the drawings. It is first to be noted that terms "upper", "lower", "right", "left" and the like terms are used herein with reference to the illustrations of the drawings or in a generally usable state of the invention.

First Embodiment

Hereinbelow, embodiments of the present invention will be described with reference to FIGS. 1 to 5.

Figure 1:
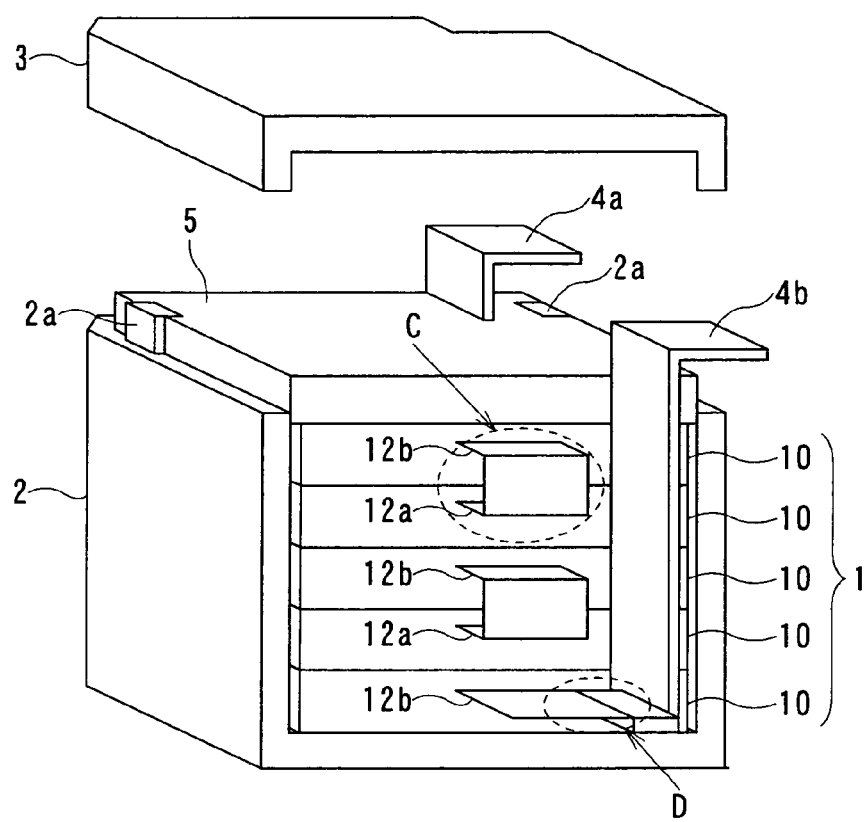
FIG. 1 is an exploded perspective view illustrating a structure of a battery pack of an assembled battery according to a first embodiment of the present invention.
Figure 2:
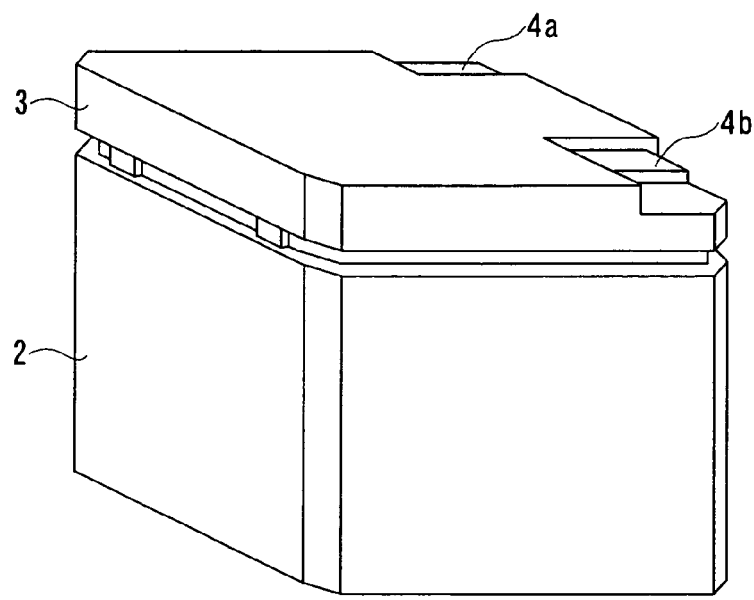
FIG. 2 is a view illustrating the general structure of the battery pack of the battery according to the present invention.

FIG. 1 is an exploded perspective view of a battery pack of an assembled battery 1 shown in FIG. 2, in which as viewed in section taken along one side surface of a case 2 of the battery pack is broken and a cover 3 of the case 2 is removed.

The battery pack of the assembled battery 1, which may be called merely "battery" hereinafter, according to the present invention is composed of: the battery 1 composed of a plurality of flat-shaped cells 10 laminated in the z-axis direction; the case 2 for accommodating the battery 1; a battery terminal 4a and a battery terminal 4b for connecting, as indicated by a portion D, one electrode terminal and the other electrode terminal of the battery 1, respectively, obtained by connecting positive electrode terminals 12a and negative electrode terminals 12b of the cells 10 in series (or in parallel) as indicated by a portion C, and leading them to the outside of the case 2;

and a lid member 5 that is fitted inside the case 2 and presses the surface of the uppermost cell 10 of the battery 1.

The detailed structures of the respective portions or members will be described hereunder.

Figure 5:
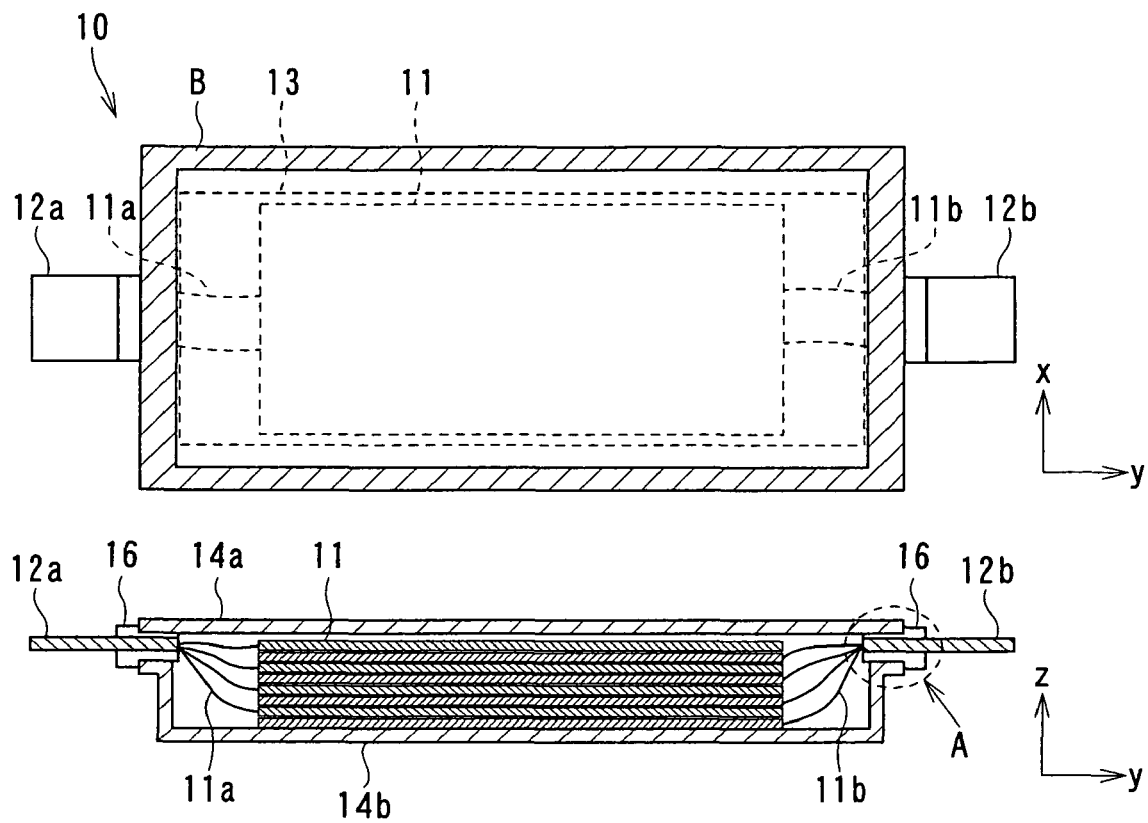
FIG. 5 is a structural view of a conventional lithium cell battery.

FIG. 5 shows a structure of each cell 10 in the case of a lithium battery. As shown in the drawing, each cell 10 is constructed such that its outer peripheral edge portion B is subjected to fusion bonding by sheet-like sealing means composed of an upper laminate film 14*a* and a lower laminate film 14*b*, thus sealing, inside the resultant structure, a plurality of generator elements 11 each including a generator element terminal 11*a*, a generator element terminal 11*b* and electrolyte, not shown, which are laminated in the vertical axis (z-axis) direction. The positive electrode terminals 12*a* and the negative electrode terminals 12*b*, which are connected to the generator elements 11, are led out from the opposite ends of the sealed outer peripheral edge portion B with respect to the horizontal axis (x-axis) direction.

The upper laminate film 14*a* and the lower laminate film 14*b* each consists of a composite film material having a heat-seal resin film located at the innermost layer, not shown, a metal foil such as an aluminum foil, and an organic resin film having rigidity, which are laminated in the described order.

Examples of the heat-seal resin film to be usable include a polyethylene (PE) film, a polypropylene (PP) film, a polypropylene-polyethylene copolymer film, an ionomer film, and an ethylene vinylacetate (EVA) film.

Further, examples of the organic resin film having rigidity to be usable include a polyethylene terephthalate (PET) film and a nylon film.

The electrode terminal portion A of the cell 10 is subjected to heat sealing in alignment with the other outer peripheral edge portion, with a sealant 16 made of polyethylene or the like being sandwiched between the upper laminate film 14*a* and the lower laminate film 14*b* which serve to maintain the sealing property, thereby effecting sealing so that no electrolyte leakage occurs.

The sealant 16 as described above is preferably formed of an insulating resin film of a multi-layer structure that exhibits different characteristics between its surface opposed to the electrode terminal 12 (which refers to the positive electrode terminals 12*a* and the negative electrode terminals 12*b*) and the surface opposed to the laminate film 14 (which refers to the upper laminate film 14*a* and the lower laminate film 14*b*).

For example, in the case of an insulating resin film having two-layer structure, it is preferred that (a) the insulating resin film is composed of an acid-denatured polyethylene layer and a polyethylene layer, with the acid-denatured polyethylene layer being arranged on the side in contact with the electrode terminal 12 or (b) the insulating resin film is composed of an acid-denatured polypropylene layer and a polypropylene layer, with the acid-denatured polypropylene layer being arranged on the side in contact with the electrode terminal 12.

For example, in the case of an insulating resin film having three-layer structure, it is preferred that (a) a polyethylene layer is arranged at the intermediate layer, with an acid-denatured polyethylene layer being arranged on either side of the polyethylene layer or (b) a polypropylene layer is arranged at the intermediate layer, with an acid-denatured polypropylene layer being arranged on either side of the polypropylene layer.

The acid-denatured polyethylene used is preferably acid-denatured low-density straight-chain polyethylene or acid-denatured straight-chain polyethylene, for example.

Furthermore, it is preferred that the polyethylene to be used is, for example, an intermediate-density or high-density polyethylene layer, the polypropylene to be used is, for example, homopolymer-based polypropylene, and the acid-denatured polypropylene to be used is, for example, random copolymer-based polypropylene.

When assembling the cells 10 into the assembled battery 1, the number of the cells 10 and the connection method for the cells 10 are set in advance on the basis of the required electric capacitance and voltage.

Further, in each of the flat-shaped, thin cells 10, the generator elements 11 including electrolyte is sealed by the laminate films 14*a* and 14*b* each consisting of an integrated polymer-based sealant having a reinforcing material such as a metal layer or a synthetic resin layer interposed therein.

The case 2 is formed from a metal such as aluminum having a thickness which provides a predetermined mechanical strength so that the cell 10 does not undergo distortion when fixed in place with a preset pressing force which will be described hereinlater.

Further, an upper portion of the case 2 is provided with a deformation part 2*a* for pressing the lid member 5, which will be described in detail later, from the upper portion of the case 2 and fixing the position of the lid member 5 with respect to the case 2 at the position where a predetermined pressing force is attained.

The case cover 3 serves as the outer covering of the battery pack obtained. Any case cover endowed with a sealing function and a good outward appearance may be used as the case cover 3. While the case cover 3 is formed of a material such as resin or aluminum, the periphery of each of the battery terminals 4*a* and 4*b* is insulated via an insulator such as resin.

Next, the lid member 5 is previously formed so as to be fitted in the inner diameter of the case 2 and is formed of a metal plate such as an aluminum plate endowed with a sufficient mechanical strength so as not to undergo distortion when pressing the upper surface of the battery 1 with a predetermined pressing force.

Further, although detailed description will be omitted, the positive electrode terminals 12*a* and the negative electrode terminals 12*b*, and the battery terminal 4*a* and the battery terminal 4*b* are each formed into a predetermined configuration from a high-conductivity metal such as aluminum or copper, and fixed to the case 2 while being insulated from the case 2.

Further, the joining portion C between the positive electrode terminal 12*a* and the negative electrode terminal 12*b* of each of the cells 10, and the joining portion D between the battery terminal 4*a* and each of the positive electrode terminals 12*a* of the battery 1 and between the battery terminal 4*b* and each of the negative electrode terminals 12*b* are fused together by welding, for example.

Next, referring to FIGS. 3 to 5, description will be given of the setting of the pressing force in the battery pack of the assembled battery constructed as described above.

Figure 3:
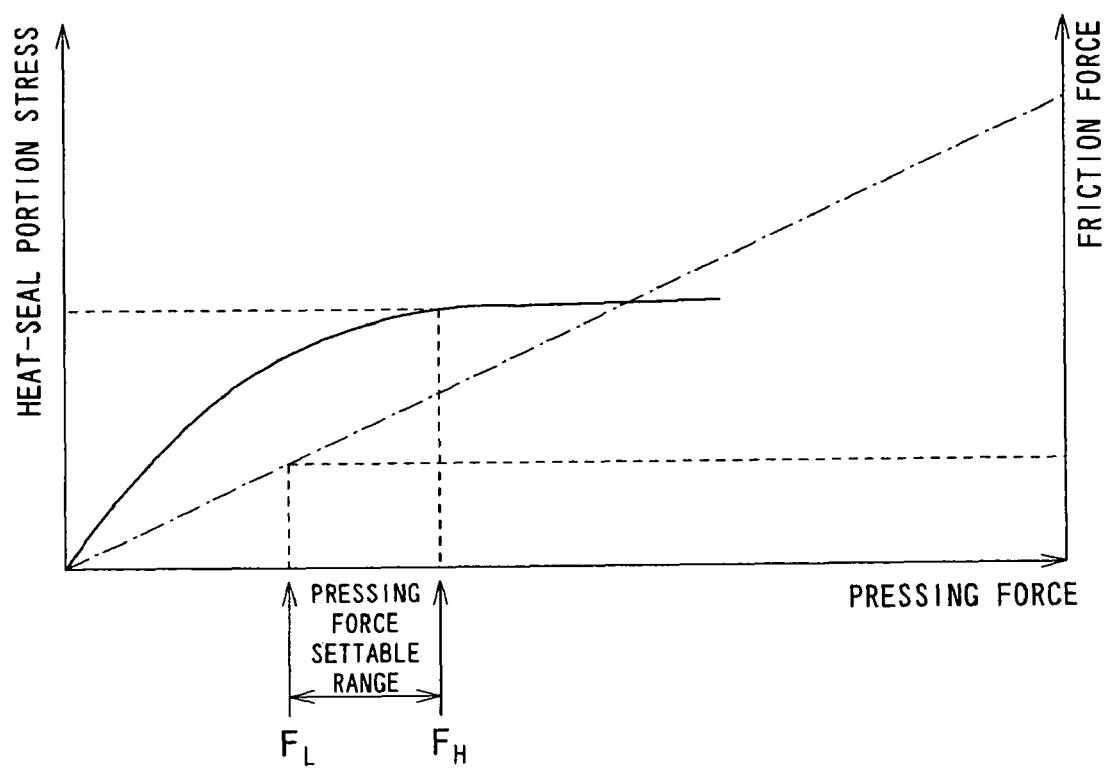
FIG. 3 is an explanatory diagram illustrating how the setting of a pressing force of a lid member is performed in the battery pack of the battery according to the present invention.

FIG. 3 illustrates a relationship among the pressing force with which the lid member 5 is pressed when the battery 1 is sandwiched between the lid member 5 and the case 2, the stress on the heat-seal portion of the outer peripheral edge portion B or the tensile stress of the laminate films 14*a*, 14*b*, and the frictional force of the surface of each cell 10 of the battery 1.

The pressing force with which the flat-shaped surface of the cell 10 is pressed is taken along the horizontal axis, and the stress on the heat-seal portion of the outer peripheral portion B of the laminate films 14*a*, 14*b* or the tensile stress of the laminate films 14*a*, 14*b* is taken along the vertical axis. The relationship between the pressing force and the tensile force at this time is indicated by the solid line.

As indicated by the solid line, the relationship between the pressing force and the stress is such that as the pressing force increases, the stress proportionately increases; as the pressing force further continues to increase, the rate of increase in the stress decreases, and breakage will be resulted by further continued application of the pressing force.

Further, the alternate long and short dash line indicates the relationship between the pressing force and the frictional force when the pressing force with which the flat-shaped surface of the cell 10 is pressed is taken along the horizontal axis, and the frictional force at each of the contact surfaces between the lid member 5 and the cell 10, between adjacent cells 10, and between the cell 10 and the lower surface of the case 2 is taken along the vertical axis.

As indicated by the alternate long and short dash line, the pressing force and the stress have a proportional relationship.

The pressing force exerted by the lid member 5 is set within the range of an upper limit value $F_H$ and a lower limit value $F_L$. The lower limit value $F_L$ represents a pressing force that can provide a frictional force for preventing each cell 10 and each element in each cell 10 from being displaced in position due to the predicted vibration from the outside. The upper limit value $F_H$ is set as a pressing force that does not cause breakage of each cell 10.

Generally, as a force is applied to the flat-shaped surface of the cell 10, the internal pressure of the cell 10 sealed by the laminate film 14a and the laminate film 14b gradually rises, which eventually causes a low-strength portion of the cell 10 to break.

This low-strength portion of the cell 10 presumably consists of the laminate film 14a and the laminate film 14b (hereinafter, the upper and lower laminate films 14 are collectively indicated by reference numeral 14) themselves, and the heat-seal portion of the outer peripheral edge portion B of the laminate film 14. Since the laminate film 14 is normally formed integrally with a metal layer interposed therein, it is presumed that the heat-seal portion of the outer peripheral edge portion B of the laminate film 14 is lower in strength and that peeling or breakage occurs in the heat-seal portion with a low strength.

Accordingly, as shown in FIG. 3, it is necessary to set the pressing force to be not larger than the upper limit value $F_H$ for the pressing force. As for the lower limit value $F_L$, it is set to be equal to or larger than a pressing force that does not cause positional displacement of each cell 10 of the battery 1 due to the vibration or positional displacement of each element inside the cell 10.

As for the adhesion strength for the heat-seal portion of the laminate film 14, it is previously determined by a tensile test or a fracture experiment for determining the shearing stress at tension and compression.

Further, the lower limit value $F_L$ is determined as follows. For example, when the friction coefficient of the laminate film 14 is $\mu$, the mass of the assembled battery 1 is W, the normal load due to the pressing by the lid member 5 is N, and the maximum acceleration in the plane parallel to the flat-shaped surface of the battery 1 is $G_{MAX}$, it is required that $N > W \times G_{MAX}/\mu$.

The range of the preset pressing force is determined from the adhesion strength for the heat-seal portion thus determined by testing, and the upper limit value of vibration which is predicted in advance.

That is, as shown in FIG. 3, the lower limit value $F_L$ and the upper limit value $F_H$ are determined in advance from the frictional force required at the time of the predicted acceleration and from the adhesion strength for the heat-seal portion of the laminate film 14, respectively.

Figure 4A:
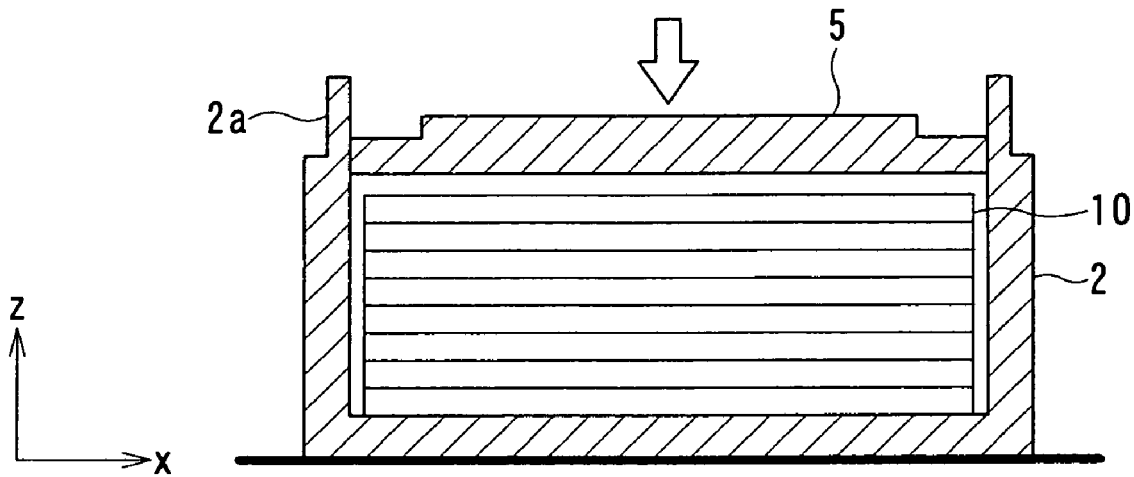
FIGS. 4A and 4B are views showing an embodiment of a plastic deformation part of a case for fixing the lid member of the battery pack of the battery according to the present invention.

Next, description will be given of the method of setting the pressing force that is determined in advance while inserting the assembled battery 1 composed of the plurality of laminated cells 10 from the upper side of the case 2 as shown in FIG. 4A.

In order to attain the preset pressing force within the battery pack, the assembling is performed by the following method.

Figure 4B:
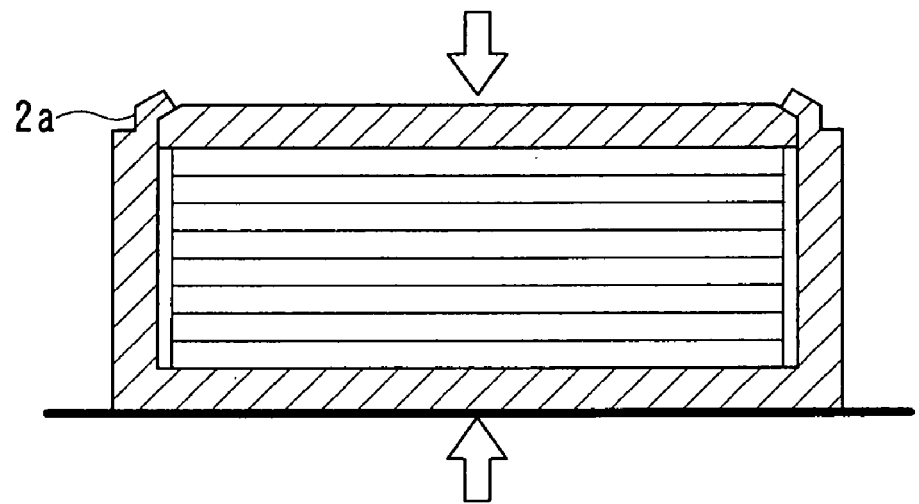

First, the fixation of the lid member 5 is performed as follows. The deformation part 2a such as a metal rib is provided in an upper portion of the case 2, and the lid member 5 is press-fitted into the case 2. Then, as shown in FIG. 4B, the deformation part 2a is bent and deformed at the position where a desired pressing force is attained by the press-fitting force, followed by fixation through spot-welding or the like.

The pressure applied by the lid member 5 is monitored on the basis of the measurement value of a pressure device, not shown, for applying a pressure to the lid member 5, or by measuring the size of the press-fitted portion.

In this way, by previously determining the range of the pressing force to be applied and fixing the lid member 5 within this pressing force range, the number of components is reduced, thereby making it possible to set the pressing force in a short period of time.

While examples of the method of preventing the positional displacement of the battery 1 include a simple fixing method of previously applying a known adhesive having adhesiveness or attaching a double-sided adhesive tape to the flat-shaped front and back surfaces of the cell 10, it is desired to adopt a method of applying a pressing force by the lid member 5 so as to fix the component elements inside the cell 10 in place.

Second Embodiment

Hereunder, the second embodiment of the present invention will be described with reference to FIGS. 6 to 8. The respective portions according to the second embodiment which are the same as those in the first embodiment shown in FIGS. 1 to 5 are denoted by the same reference numerals and detailed description thereof will be omitted.

The second embodiment differs from the first embodiment in that, while in the first embodiment, the respective cells 10 are laminated as they are and fixed in place by pressing with the lid member 5, in the second embodiment, on the other hand, the cells 10 are each placed on a tray 1a, the respective cells 10 are laminated with each of the cells 10 being placed on the tray 1a, and one end of the laminate of the cells is pressed in the thickness direction by the lid member 5, thereby effecting fixation.

Figure 6:
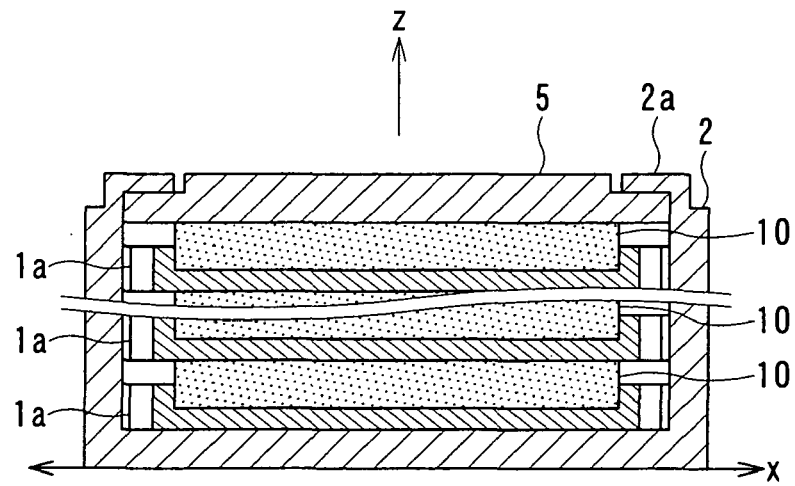
FIG. 6 is a sectional view illustrating a structure of a battery pack of an assembled battery according to a second embodiment of the present invention.

FIG. 6 is a sectional view of a battery pack of an assembled battery composed of three laminated cells 10. The cells 10 are each placed on the tray 1a and are laminated with contact parts thereof opposed to the inner side wall surface of the case 2 being held in press contact with the inner side wall surface. The upper portion at one end of the laminate is pressed by the lid member 5, thereby bending the deformation part 2 and fixing the lid member 5 to the case 2.

Figure 7A:
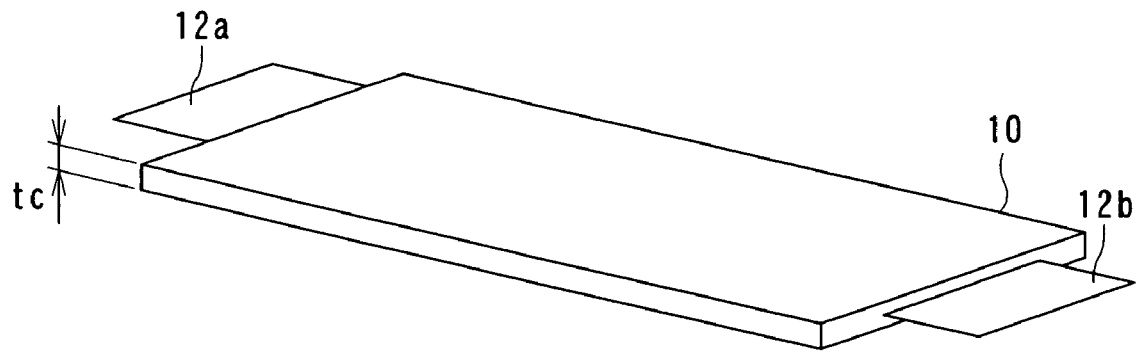
FIGS. 7A and 7B are perspective views illustrating a structure of a tray according to the second embodiment of the present invention.

Next, the structure of the tray 1a will be described in detail. FIG. 7A is a perspective view of the flat-shaped cell 10 having a thickness tc. The positive electrode terminal 12a and the negative electrode terminal 12b are led out from both end portions of cell 10 with respect to the x-axis direction.

Figure 7B:
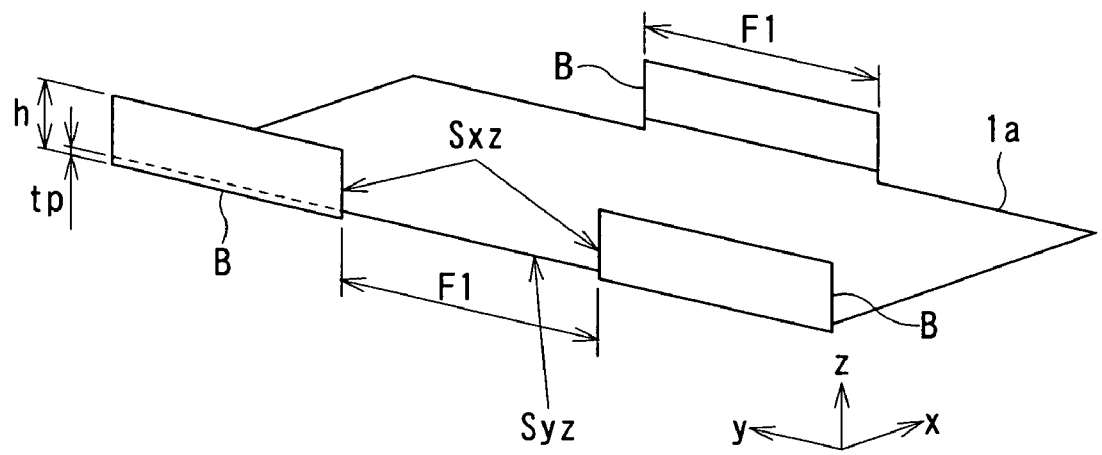

FIG. 7B is a perspective exterior view of the tray 1a on which the flat-shaped cell 10 as shown in FIG. 7A is placed. The tray 1a is formed of, for example, a thin metal plate having good thermal conductivity.

Contact parts B of the tray 1a are formed as follows. Both the end portions of the flat-shaped tray 1a having a thickness tp are bent vertically at a plurality of locations into opposing L-shaped parts. The height h of the bent L-shaped parts constitutes each contact part B. As for the number of the contact parts B, for example, one bent contact part 1a of a width F1 is provided at the center of one of the two opposite ends, and two contact parts B of a width in conformity with the width F1 are provided at the other end so as to be spaced apart from each other by a distance corresponding to the width F1.

Further, an end face Sxz in parallel to the x-z-axis plane of each contact part B, and an end face Syz in parallel to the y-z-axis plane thereof are machined in advance with a predetermined accuracy required for laminating the respective trays 1a for fitting engagement as will be described later.

It should be noted that the number and fitting dimension of the contact parts 1a can be selected appropriately as long as the structure of the contact parts 1a readily allows fitting engagement upon lamination.

Figure 8A:
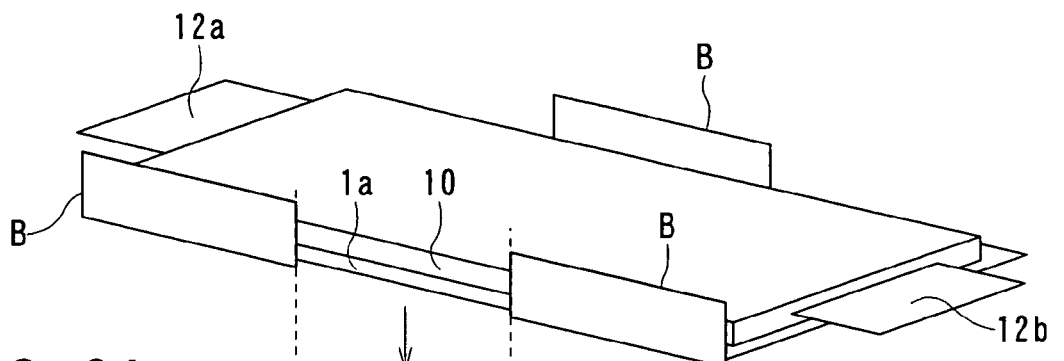
Figure 8B:
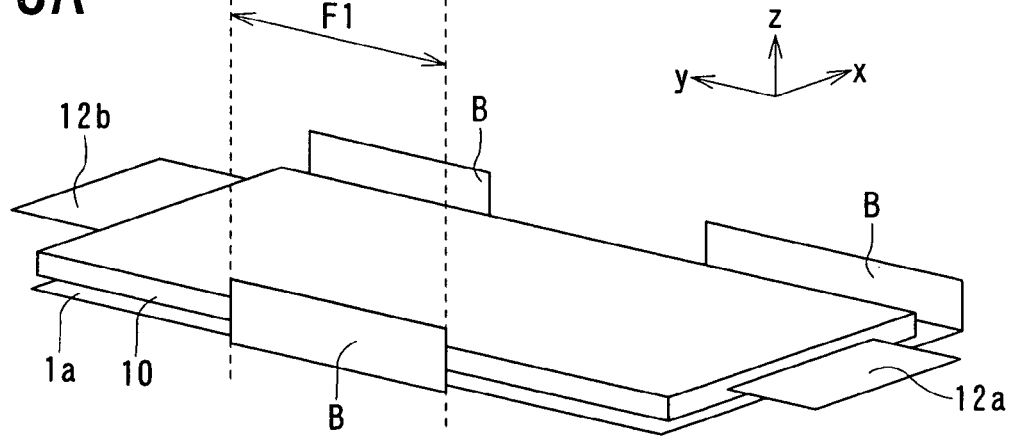
Figure 8C:
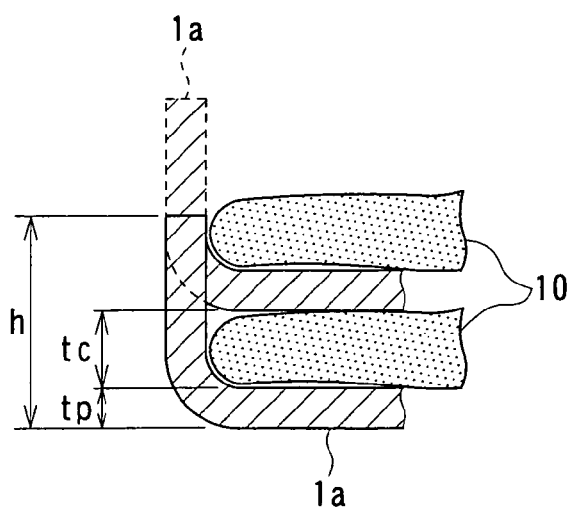

FIGS. 8A to 8C illustrate a lamination method for the trays 1a constructed as described above. FIGS. 8A and 8B are perspective views showing a state in which the polarities of the cells 10 to be laminated are placed in difference directions. For example, the tray 1a with the cell 10 shown in FIG. 8A placed thereon is laminated on the cell 10 shown in FIG. 8B while bringing their contact parts B into fitting engagement with each other.

FIG. 8C is a sectional view of the fitting engagement portion. Here, the bending height "h" of each contact part B of the tray 1a is set in advance so as to satisfy the following relational expression.

$$tp+tc<h<2(tp+tc)$$

With this arrangement, upon laminating the tray 1a and the cell 10, the contact part B of the tray 1a is inserted into the portion of the tray 1a located above by one layer in the case when no contact part B is provided. Accordingly, with respect to the y-axis direction, the contact part B of the lower tray 1a and the contact part B of the upper tray 1a contact each other, thereby preventing movement of the trays 1a relative to each other. Further, with respect to the x-axis direction, the contact part B of the lower tray 1a and the ends of the portion of the upper tray 1a where no contact part B is provided are brought into contact with each other, thereby preventing movement of the trays 1a relative to each other.

By laminating the cells 10 using the trays 1a provided with the contact parts B constructed as described above, even when there is vibration applied from outside the battery pack of the battery, the contact parts of vertically adjacent upper and lower trays 1a are brought into fitting engagement with each other, thereby moving the trays 1a relative to each other in neither x-axis nor y-axis direction. Further, since there is no relative displacement between the trays 1a, it is also possible to suppress the movement of the cells 10 placed on the trays 1a.

Further, by providing the bottom portion of the case 2 with a projection which comes into fitting engagement with the portion of the lowermost tray 1a with which no contact part B is provided, the relative displacement of the case 2 and the tray 1a in the in-plane direction of the tray 1a can also be suppressed.

Further, when placing the cell 10 on each tray 1a, the polarity of the cell 10 is placed so as to be in the same direction with respect to the contact part B of the tray 1a.

With this arrangement, when laminating the trays 1a with the cell 10 placed thereon, the contact parts B of the vertically adjacent trays 1 cannot be brought into fitting engagement with each other unless the trays 1a are oriented such that the polarities of cells 10 become opposite to each other. Accordingly, the cells 10 are always laminated in such a manner that the polarities of the electrodes of the cells 10 are alternated. Therefore, when laminating the trays 1a with the cell 10 placed thereon, the cells 10 can be reliably connected in series for lamination without making any particular consideration to the polarities of the cells 10.

As described above, by providing the fitting engagement part to each of the trays 1a on which the cell 10 according to the second embodiment is placed, it is possible to provide a battery pack of a battery which is not readily displaced in position due to vibration from the outside, and which can prevent operation errors at the time of the assembly of the cells 10 to be laminated.

Third Embodiment

The third embodiment of the present invention will be described with reference to FIGS. 9A to 9D. The respective portions according to the third embodiment that are the same as those of the first and second embodiments shown in FIGS. 1 to 8 are denoted by the same reference numerals and detailed description thereof will be omitted.

Figure 9C:
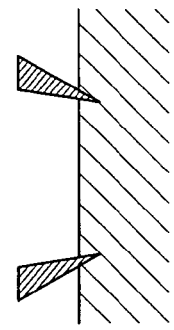
FIGS. 9A to 9D are sectional views illustrating a structure of a battery pack of an assembled battery according to a third embodiment of the present invention.
Figure 9D:
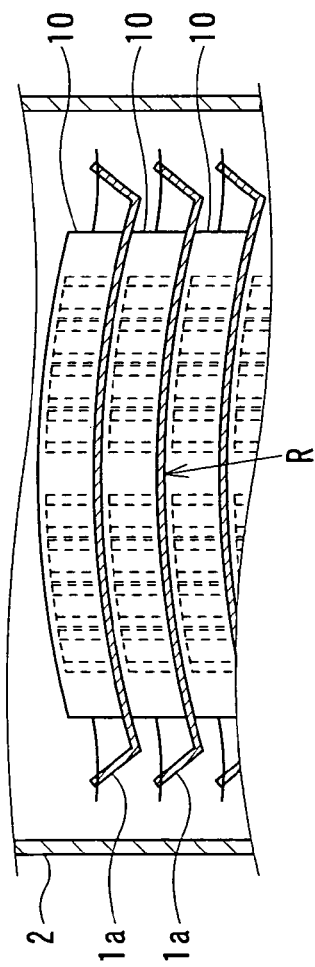
Figure 9A:
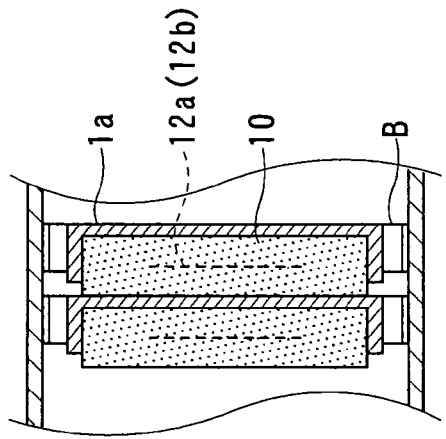
Figure 9B:
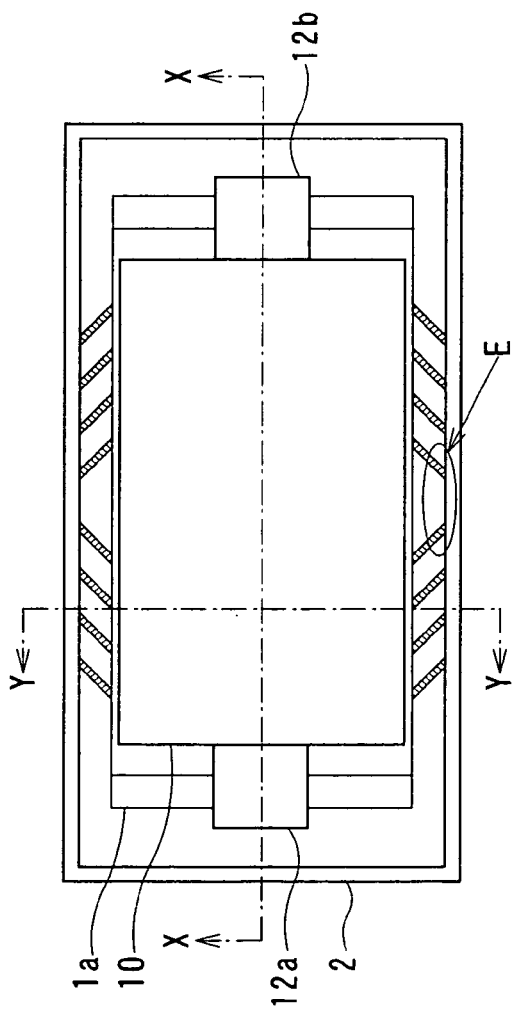

FIG. 9A is a plan view, as seen from above, of the battery pack excluding the lid member 5, FIG. 9B is a sectional view taken along the line x-x of FIG. 9A, and FIG. 9C is a sectional view taken along the line y-y of FIG. 9A.

For example, the tray 1a according to the third embodiment is provided with eight contact parts B which are brought into press contact with the opposite inner side wall surfaces of the case 2 with respect to the y-axis direction. Two sets of four contact parts B are bent in directions opposite to each other on the y-axis.

For example, as shown in FIG. 9D of an enlarged view of the portion E shown in FIG. 9A, the distal end portion of each contact part B is shaped like a sharp knife-edge and is formed from a material such as copper which is harder than the metal forming the case 2.

The case 2 is formed from, for example, aluminum which is softer than the tray 1a. The contact parts are adapted so that when the tray 1a with the cell 10 placed thereon is inserted from the upper side of the case 2, the distal end portions thereof penetrate into the inner wall of the case 2 for pressfitting.

Through the provision of the tray 1a as described above, even when the vibration from the outside of the battery pack is applied in either one of the right and left directions on the y-axis, the distal end portion of either one of the contact parts provided in an opposed relation is hitched onto the inner side wall surface of the case 2, thereby suppressing movement of the tray 1a in the y-axis direction. Further, since the contact parts B and the case are in contact with each other in the y-axis direction, the movement of the tray 1a in the y-axis direction is suppressed.

Further, as shown in FIG. 9B, in the state where the flat-shaped portion of each tray 1a is formed as, for example, a gently curved convex surface in advance, and with the cells 10 being in the laminated state, the resultant structure is pressed by the lid member 5 from the upper side to thereby effect fixation.

By thus curving the flat-shaped portion of the tray 1a, the curving of the cell 10 and tray 1a serves as an obstacle to the linear vibration coming from the outside of the battery pack, thereby preventing relative displacement.

Although the above configuration exerts no displacement suppressing effect with respect to the vibration acting in the circumferential direction of the curve of the tray 1a, since vibration rarely occurs in such a direction, generally speaking, the effect of preventing the displacement between the cell 10 and the tray 1a is satisfactory.

It should be noted that by partially varying the curvature of the curved convex surface of the flat-shaped portion of the tray 1a, a displacement suppressing effect can be attained with respect to any kind of vibration. The variation in curvature can be realized using a part of the arc of an ellipse.

Further, while the tray 1a may be curved in any in-plane direction, with respect to the direction of the electrode of the cell 10 (x-axis direction), such a curved configuration proves particularly effective because with respect to this direction, it is difficult to adopt a structure, whereby the displacement is prevented by bending, like the portion where the contact parts B are mounted as shown in FIG. 9C, the ends of the tray 1a toward the side where the cell 10 is placed and bringing the bent portions and the cell 10 into contact with each other.

By providing the tray 1a including the contact parts B and the concave and convex portions as described above, it is possible to provide a battery pack in which the tray 1a and the cell 10 placed thereon are not readily displaced when the battery pack vibrates.

The present invention is by no means limited to the above-described embodiments. That is, any fixation method may be adopted as long as it involves forming each of the case and the lid member so as to have a high mechanical strength sufficient for it to be regarded as a rigid body, and sandwiching the battery between the case and the lid member, followed by fixation with the application of a predetermined pressing force. Further, in implementing the present invention, various modifications can be made without departing from the scope of the appended claims of the present invention. For example, the fixation of the components inside each cell 10 can be performed in a more optimized manner by providing an adhesive tape to the surface that comes into contact with the flat-shaped surface of the cell and finely adjusting the configuration of the adhesive tape.

Further, the configurations of the tray and of the fitting engagement portions of the contact parts B thereof may be modified in accordance with the configurations of the battery and of the case thereof into various configurations which allow positioning of the cell on the tray and involves relatively little positional displacement.

What is claimed is:

1. A battery pack of an assembled battery comprising:
    an assembled battery including a plurality of flat-shaped cells that are hermetically sealed by a laminate film;
    a plurality of trays each formed of a thin metal plate, each cell placed on a respective tray, each tray including opposing peripheral edges formed with fitting engaging parts, respectively, by which adjacent trays come into fitting engagement with each other when the trays are vertically laminated, wherein each of the fitting engaging parts includes at least first and second extending portions extending substantially perpendicular to the tray on a first edge portion of the tray separated by a portion having no extending portion, and a third extending portion on a second edge portion of the tray, opposite the first edge portion, extending substantially perpendicular to the tray from a same face of the tray and in a same direction that the first and second extending portions extend, and having a width and positioning matching the portion having no extending portion on the first edge of the tray, so that when the trays are laminated, the extending portions of one tray are inserted into and engaged with the portions having no extending portions of another tray adjacently laminated on the one tray;
    a case for accommodating the cells in a state in which the cells are laminated in a thickness direction thereof while being placed on the trays, the case having an opening formed at least at one end thereof, the plurality of trays being fitted inside the case;
    a lid member for pressing the cells, which are laminated while being placed on the trays, from one end of the opening of the case in a laminating direction; and
    a fixing member for fixing the lid member to the case at a position to which a predetermined pressing force is applied.

2. The battery pack according to claim 1, wherein each of the peripheral edge portions of the respective trays includes a contact part for guiding at least a placing position for each of the cells, the contact part contacting opposite inner wall surfaces of the case.

3. The battery pack according to claim 2, wherein the contact part of each of the trays is formed by a plurality of thin leaf springs that come into line-contact with an inner wall surface of said case, said contact part being brought into press contact with the inner wall surface of the case.

4. The battery pack according to claim 2, wherein the contact part of each of the trays is formed by a plurality of thin leaf springs that come into surface-contact with an inner wall surface of the case, the contact part being brought into press contact with the inner wall surface of the case.

5. The battery pack according to claim 2, wherein the contact part of each of the trays includes a plurality of thin leaf springs that are bent in different directions with respect to a direction orthogonal to the laminating direction of the cells.

6. The battery pack according to claim 1, wherein the trays are formed by curving flat-shaped plates on which the cells are laminated.

7. The battery pack according to claim 1, wherein the case includes at a bottom corner portion at which a part that comes into fitting engagement with the lowermost one of the trays contacting a bottom surface of the case is provided.

8. The battery pack according to claim 1, wherein each of the peripheral edge portions are formed by vertically bending edge portions of the tray each in substantially a L-shape.

9. The battery pack according to claim 1, wherein the opposing peripheral edges of each of the trays extend in a direction substantially perpendicularly to a tray laminating direction.

10. The battery pack according to claim 9, wherein when the adjacent trays are laminated, a following equation is satisfied, $$tp+tc<h<2(tp+tc)$$

in which h is a height of the peripheral edges of the tray, tp is a thickness of the tray, and tc is a thickness of the cell.

11. The battery pack according to claim 9, wherein when the cell is placed on the tray, polarity of the cell is placed so as to be in same direction with respect to the contact part, and when the trays are laminated with the cells, the polarities of the cells are alternated.

12. The battery pack according to claim 1, wherein each of the trays is formed of a thin metal plate having good thermal conductivity.

* * * * *